United States Patent [19]

Picone

[11] 4,277,531

[45] Jul. 7, 1981

[54] HIGH STRENGTH FIBER GLASS REINFORCED THERMOPLASTIC SHEETS AND METHOD OF MANUFACTURING SAME INVOLVING A REVERSE BARB NEEDLING PROCEDURE

[75] Inventor: Charles E. Picone, Shelby, N.C.

[73] Assignee: PPG Industries, Inc., Pittsburgh, Pa.

[21] Appl. No.: 64,158

[22] Filed: Aug. 6, 1979

[51] Int. Cl.³ .................. B32B 5/06; B32B 17/04; D04H 3/10; D04H 3/12

[52] U.S. Cl. .................. 428/228; 28/107; 28/110; 28/115; 65/2; 65/11 R; 428/234; 428/235; 428/285; 428/300; 428/301

[58] Field of Search .............. 65/11 R, 2; 28/107, 28/110, 115; 428/285, 300, 301, 228, 234, 235

[56] References Cited

U.S. PATENT DOCUMENTS

| 461,602 | 10/1891 | Boult | 28/115 |
|---|---|---|---|
| 1,454,049 | 5/1923 | Genung | 28/107 |
| 3,473,205 | 10/1969 | Zocher | 28/107 |
| 3,621,092 | 11/1971 | Hofer | 264/322 |
| 3,626,053 | 12/1971 | Hofer | 264/322 |
| 3,664,909 | 5/1972 | Ackley | 264/258 |
| 3,684,645 | 8/1972 | Temple et al. | 264/257 |
| 3,713,962 | 1/1973 | Ackley | 264/153 |
| 3,849,148 | 11/1974 | Temple | 252/8.9 |
| 3,850,723 | 11/1974 | Ackley | 264/322 |
| 3,883,333 | 5/1975 | Ackley | 65/2 |
| 3,915,681 | 10/1975 | Ackley | 65/11 R |

FOREIGN PATENT DOCUMENTS

| 732806 | 4/1966 | Canada | 28/115 |
|---|---|---|---|
| 1129623 | 9/1956 | France | 28/107 |
| 250682 | 11/1926 | Italy | 28/115 |
| 6474 | of 1874 | United Kingdom | 28/115 |
| 266456 | 2/1927 | United Kingdom | 28/115 |
| 498765 | 1/1939 | United Kingdom | 28/197 |
| 1300940 | 12/1972 | United Kingdom | 28/107 |
| 250682 | 11/1926 | Italy | 28/115 |

*Primary Examiner*—James C. Cannon
*Attorney, Agent, or Firm*—John E. Curley

[57] ABSTRACT

A fiber glass reinforced thermoplastic laminant of high flexural strength and a method of preparing the laminant is described in which special needling of the fiber glass mat used as the reinforcement is undertaken to minimize damage to the strands making up the mat during needling while insuring that the strands are moved during needling of the mat to provide strands in the mat that are transverse through the long axis of the mat after needling. The mat upon completion of the needling is then laminated with a thermoplastic resin to produce a sheet product having improved tensile characteristics.

8 Claims, 5 Drawing Figures

HIGH STRENGTH FIBER GLASS REINFORCED THERMOPLASTIC SHEETS AND METHOD OF MANUFACTURING SAME INVOLVING A REVERSE BARB NEEDLING PROCEDURE

BACKGROUND OF THE INVENTION

Fiber glass reinforced thermoplastic resinous sheet have been described in U.S. Pat. No. 3,664,909. Sheet materials described in the aforementioned patent have found utility in that they can be stamped in a mechanical press to produce shaped articles for various uses such as automotive seat shells, battery trays, luggage, musical instrument cases and the like.

The process typically employed to produce shaped articles from fiber glass reinforced thermoplastic sheets are described in U.S. Pat. Nos. 3,621,092 and 3,626,053.

Fiber glass reinforced thermoplastic sheets have also found utility in sheet form as liners for fleet trucks and as base board materials for ice hockey arenas and other applications requiring high impact strength.

In general the process for preparing thermoplastic resin sheets for either stamping or for use in sheet form has been the same with respect to the fiber glass mat employed to reinforce the resin. Thus, in preparing sheets for use as a stampable material or as a sheet material not requiring further stamping the mat has been prepared by laying down the continuous glass fiber strands on a moving conveyor chain. The process conventionally employed to produce such a continuous strand is described in U.S. Pat. No. 3,883,333. As described in this patent, which is hereby incorporated by reference, the mat after formation on the conveyor chain is subsequently needled just prior to be collected. In the past this needling has been conducted to provide a plurality of penetrations of the mat by the needles and good entanglement of the strands to mechanically bond the mat. At the same time, the action of the needles in catching the strands in barbs and pushing them through the bed plate and having them returned as the mat moves horizontally places a plurality of broken filaments in the mat rendering it useful for reinforcing resinous sheets that are to be stamped. The broken filaments move with the resin during the stamping operation to insure that the resin flowing to the ends of the mold is properly reinforced with glass.

While this process has proved efficacious in producing high strength materials from glass reinforced thermoplastic sheets that are stamped to produce, for example, automotive parts considerable improvement is desired in the flexural strength characteristics of the sheet products manufactured from such mats when the product is to be utilized in sheet form.

THE PRESENT INVENTION

In accordance with the instant invention a high strength thermoplastic resin reinforced with fiber glass is provided which has higher impact strengths than have been heretofore capable of being obtained utilizing the processes of the prior art. In addition, a method is provided for modifying the needling operation in the preparation of fiber glass mats utilized to reinforce thermoplastic resin sheets which render the final material stronger than that which has heretofore been available.

In producing the products of the instant invention therefore, a continuous strand mat is produced and it is then subjected to a needling operation in which the continuous strand mat is passed through a needling zone in which a plurality of needles are reciprocated in a vertical direction so that they penetrate the mat passed therethrough. The continuous strand mat may be produced by any of the conventional processes available in the art. One such process is described in U.S. Pat. No. 3,883,333, assigned to the assignee of the instant invention and which is incorporated herein by reference. The needles are constructed and arranged with a barb which will not entangle the fiber glass strands contained in the continuous strand mat as the needles pass through the mat on the downward stroke of the vertical reciprocation of the needles but which will entangle filaments contained in the continuous strand mat during the upward stroke of the reciprocating needler. The length of the needle, the depth of the penetration of the needle through the mat during its passage through the needling machine and the extent to which glass fibers entangled in the barb of the needle are moved in a vertical direction through the mat during the upward stroke of the needling machine determine the extent to which improved strength can be imparted via reduced glass breakage to a thermoplastic resin sheet which incorporates a mat so needled in it as the basic reinforcement.

The mats produced by the instant process are characteristically mats which contain a significant portion of the mat in the form of continuous strands and which have strands or filaments oriented in a direction transverse to the mat length. The strands and filaments so disposed are entangled in the continuous strands forming the major portion of the mat and one series of the mat contains little or no fibers at the surface which are not in continuous strand form. Thus in the overall needling operation, strands and filaments which form the bulk of the continuous strand mat product passing through the needling machine are disturbed by the needles catching the strands on the upward stroke and moving them in a vertical direction so that an entanglement of strands from the lower layer of the mat passing through the machine to the interior of the mat as they move toward the opposite surface. The net result of the needling operation is that a mat is provided which has some entanglement of strands and filaments in a vertical direction and entanglement of strands with the strands of the layers lying immediately above the strand or filament that is being moved by the needle while at the same time causing little or no filament breaks. Characteristically the bottom layer of the material removed from the machine will have a relatively smooth surface composed entirely of continuous strands while the upper surface of the mat will have a roughened appearance caused by entangled strands and filaments which have been moved during the upward stroke of the reversed barb needles vertically through the layers of continuous strands. It is a characteristic of the instant mat that relatively few of broken filaments result from the movement of the needle in the upward direction even through some strands of filaments are entangled therein. In a typical mat forming operation for example, the mat entering the needling machine may have a depth or height of 2 to 3 inches. In its passage through the needling machine it is compressed to a depth or height of only a half an inch.

Another reason for the characteristic appearance of the mat is that in reciprocating the needles in an upward direction with a reversed barb the needles are passed through a plurality of cylindrical holes in a stripper plate which rests upon the mat during its passage through the needling machine. The filaments are thus pulled from the surface of the barb as the mat proceeds in a horizontal direction after the stroke of a needle in a downward and upward direction with the entangled strands falling back onto the mat surface. This may be significantly distinguished from an operation in which needles are provided with barbs in a downward direction that carry strands from the surface of the mat through a bed plate in a needling machine where they are actually stripped from the surface of the needles when they penetrate the mat and pass completely into the bed plate.

BRIEF DESCRIPTION OF THE DRAWINGS

The invention will be more specifically described with reference to the accompanying drawings in which.

DETAILED DESCRIPTION OF THE DRAWINGS

Figure 1:
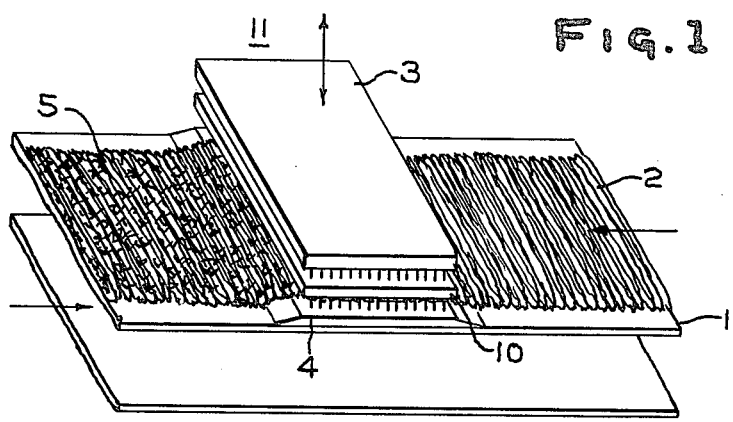
FIG. 1 shows an exploded view, in perspective, of a needling machine utilizing a continuous strand mat to make a needled mat product in accordance with the instant invention.
Figure 4:
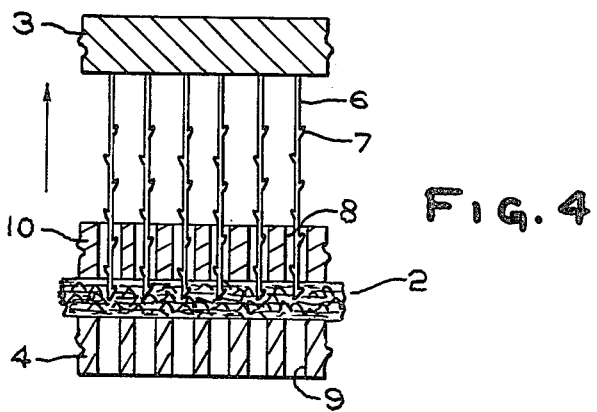
FIG. 4 shows the needles in an upward stroke as they are removed from the bed plate, pass through the mat and enter the stripper plate area.

As shown in FIG. 1 a continuous strand mat 2 is conveyed in a horizontal direction on a conveyor belt 1 into the entrance of a needling machine generally indicated as 11 and containing a needle board 3 having a plurality of elongated needles 6 affixed to the under surface thereof. The needler 11 is equipped with a stripper plate 10 which is a metal plate, preferably steel having a plurality of cylindrical orifices 8 drilled therein and through which the needles 6 pass on the downward stroke of the needleboard 3. The mat 2 during its passage through the needling machine 11 passes over a bed plate 4 which is also metal, preferably steel, and provided with a plurality of holes or orifices 9 drilled therein which are aligned with the orifices 8 of the stripper plate 10, so that the needles 6 may pass freely through the orifices 8 of the stripper plate 10 as well as entering the bed plate 4 through orifices 9. Thus, in the downward stroke of the reciprocation of the needle board 3 the needles 6 pass through the orifices 8 through the mat 2 and into the orifices 9 of the bed plate 4. The needles 6 are provided with a multiplicity of barbs 7 which are smooth on their surfaces so that they pass freely through the mat 2 during a downward stroke of the needle 3 and are arranged so that they catch filaments and strands 2a contained in the mat 2 on the upward stroke of the needle board 3. This is more clearly illustrated in FIG. 4 where during the upward stroke of the needle board 3 filaments and strands 2a are shown being drawn in an upward direction as the needles 6 pass through the mat 2 on this upward stroke.

Figure 2:
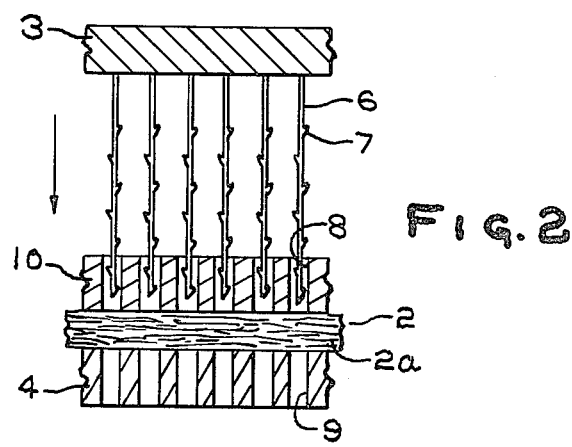
FIG. 2 is a cross-section of the needler of FIG. 1 showing the needles in their upward position prior to penetrating the mat surface.
Figure 3:
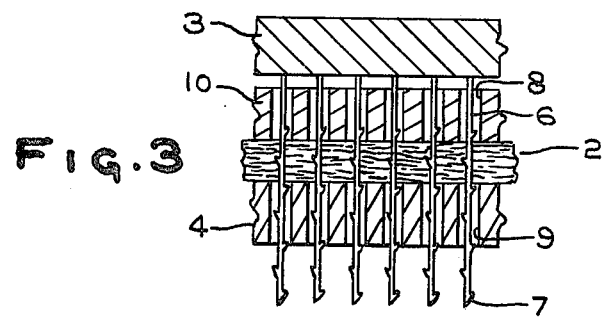
FIG. 3 is a cross-section of the FIG. 1 showing the needles passing through the stripper plate mat and into the bed plate of the needling machine.

In the operation of the needling system, the needle board 3 reciprocates in a downward and upward stroke mode so that the needles are poised as shown in FIG. 2 prior to the activation of the machine and are plunged downwardly so that they penetrate the continuous strand mat 2 on the downward stroke and enter the bed plate 4 through holes 9 in this downward stroke. When the machine is reciprocated in a vertical direction upwardly after the downward stroke has been completed the barbs 7 of the needles entangle strands at the under surface of the mat 2 and pull them in a vertical direction until the barb reaches the stripper plate 10 where the strands are then disengaged from the surface of the barbs as the needles enter the holes 8. Thus the continuous strands forming the mat 2 are disturbed by the upward movement of the needle board 3 and its associated needles 6 and the barbs contained thereon so that the barbs pick up filaments and strands on the upward stroke and move them in a vertical direction toward the upper surface of the mat 2. The strands are pulled away from the barbs 7 in the upward direction when the barb enters the holes 8 of the stripper plate 10 thus pulling the strands from the surface of the barbs 7 and allowing them to lay in the mat and become entangled with layers of strand located immediately above the layer from which the filament or strand was drawn during the upward movement of the needle and its associated barb 7. As will be readily understood by the skilled artisan the reciprocation of the needle board 3 occurs in a more or less rapid fashion in that the needle board may reciprocate a complete stroke, one downward and one upward in the period of 0.2 seconds and upon the completion of each reciprocation rolls are provided in association with the needling machine to move the mat in a horizontal direction as the needle board returns to its set position after completion of its upward stroke. On the next downward stroke of the needle board 3 another portion of the mat is thus penetrated by the needles as they reciprocate downwardly and upwardly for the second full stroke. In this manner many penetrations of the mat take place during its passage through the needle machine.

In a typical operation a continuous strand mat passing through a needling operation of this character will receive penetration from the needles mounted on the needling board ranging from 200 to 500 penetration per square inch of mat surface. The density of the penetration per square inch can be varied considerably depending upon the nature of the mat and the quality of the product desired. However, in general the number of penetrations per square inch will be in the range of between 200 and 500. Typically, acceptable mat has been produced utilizing the instant invention by providing, with a 25 gauge needle and penetration on the order of 200 to 600 penetration per square inch of mat.

It has also been observed in preparing mats in accordance with the teachings of this invention utilizing the reversed barbed needle that mat loft, which has in the past been a function of the degree of needling and needle penetration (depth), is not appreciably affected by increasing the penetrations per square inch from a low number to a high number. This is perhaps attributable to the fact that in utilizing the reversed barbed needle in the manner described herein little or no fragmentation of the fibers occurs. Thus it has been found upon examination of the continuous strand needled mats produced in accordance with the instant invention that little or no broken filaments are produced. By little or no broken filaments it is meant to indicate that based on the total weight of the mat the broken filament content is usually at a value of less than 10 percent by weight, typically 5 to 8 percent.

The needled mats produced in accordance with the instant invention are utilized to reinforce various thermoplastic resins. Many types of resins may be employed to produce products which are useful as reinforced plastics for various purposes. Typical resins suited for this use are homopolymers and copolymers of resins such as: (1) vinyl resins formed by the polymerization of vinyl halides or by the copolymerization of vinyl halides with unsaturated polymerizable compounds, e.g., vinyl esters; alpha, beta-unsaturated acids; alpha, beta-unsaturated esters; alpha,beta-unsaturated ketones; alpha,beta-unsaturated aldehydes and unsaturated hydrocarbons such as butadienes and styrenes; (2) poly-alpha-olefins such as polyethylene, polypropylene, polybutylene, polyisoprene and the like including copolymers of polyalpha-olefins; (3) phenoxy resins; (4) polyamides such as polyhexamethylene adipamide; (5) polysulfones; (6) polycarbonates; (7) polyacetyls; (8) polyethylene oxide; (9) polystyrene, including copolymers of styrene with monomeric compounds such as acrylonitrile and butadiene; (10) acrylic resins as exemplified by the polymers of methyl acrylate, acrylamide, metholoacrylamide, acrylonitrile and copolymers of these with styrene, vinyl pyridines, etc.; (11) neoprine; (12) polyphenolene oxide resins; (13) polymers such as polybutylene terephthalate and polyethylene terephthalate; and (14) cellulose esters including the nitrate, acetate, propiomate, etc. This list is not meant to be limiting or exhaustive but merely illustrates the wide range of polymeric materials which may be employed in the present invention.

Figure 5:
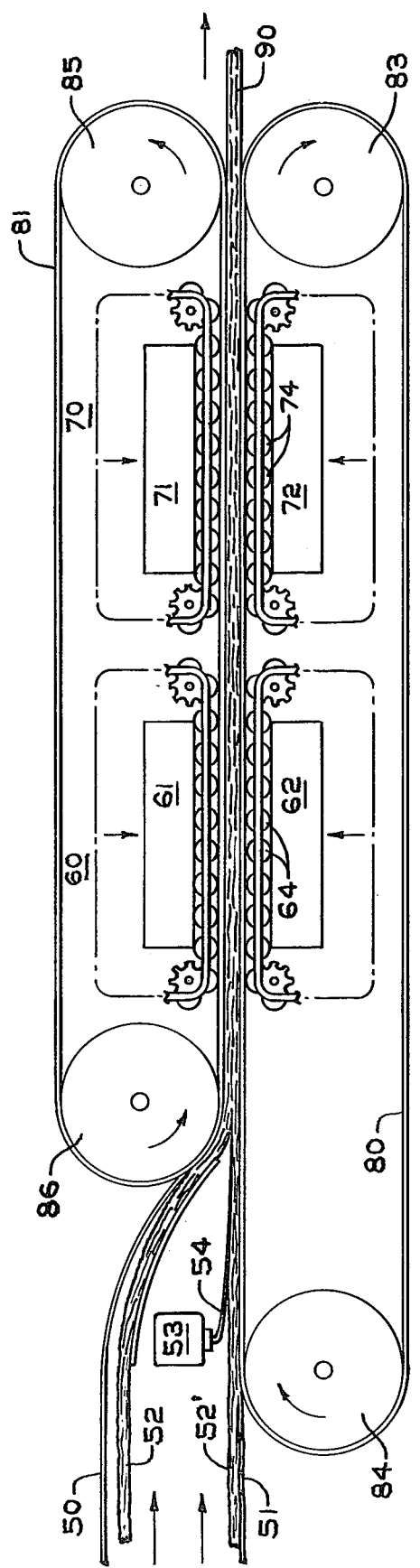
In FIG. 5 a diagrammatic illustration of equipment laminating mat products produced in FIG. 2 with thermoplastic resin to produce superior thermoplastic resin sheet products.

In FIG. 5 an illustration of equipment is shown suitable for laminating the mat products produced in accordance with the instant invention with thermoplastic resins sheets to produce superior thermoplastic resin products in accordance with this invention. Thus, as shown in the drawing two thermoplastic resin sheets 50 and 51 are fed to a first laminating zone generally indicated 60. Fed in beteeen the two resin sheets 51 and 50 are two needled mats prepared in accordance with this invention and identified by the numerals 52 and 52'. Intermediate the mats 52 and 52' fed from extruder 53 is a molten thermoplastic resin 54 of composition typically identical to the composition of the thermoplastic resin sheets 50 and 51. The resin sheets 50 and 51 and the mats 52, 52' and the molten resin 54 are passed into the hot laminating zone 60 by belts 81 and 80 respectively as they pass over rollers 84 and 83 and 85 and 86 respectively. The belts are moved through the zone utilizing the sprocket drives 63 and the roller members 64 associated therewith to drive the belts through the machine. The product emanating from the hot zone 60 is passed into a cold zone 70 operated at cooler temperatures than the hot zone 60 where the belts 81 and 82 are moved continuously again utilizing the sprocket members 73 and associated rollers 74 to move the belt in a continuous straight line fashion through the cold zone. In the hot zone platen press members 61 and 62 are utilized to apply pressure to the mats 52 and 52' and the associated thermoplastic resin sheets 50, 51 and the thermoplastic molten resin 54 during their passage through the zones. Similarly in the cold zone, platen press members 71 and 72 apply pressure to the laminant during its passage through that zone. The pressures applied in both zones are preferably equal although pressure can be varied in each zone to independently to apply greater or lesser pressures in one zone than the other. Upon cooling in the laminating zone 70 the finished sheet product 90 is removed and may then be utilized as a final product material.

When the mats of the instant invention are utilized for a thermoplastic resin matrix such as polypropylene, it is preferable to use strands which have been sized with the size described and claimed in U.S. Pat. No. 3,849,148. If the mat is used for reinforcing other than thermoplastic resins such as thermoset resins for example the size on the glass strands will have to be changed to render the glass suitable for the particular resin system to be employed as will be readily understood by the skilled artisan.

EXAMPLE

In a typical example utilizing reverse barbed needles a continuous glass fiber strand is passsed through a needling zone containing a multiplicity of needles which were reciprocated in an up and down fashion as the mat moved through the zone at a speed of 6 feet per minute. The finished product contained approximately 535 needle penetrations per square inch. The finished mat was utilized as a mat and laminated into sheet form with polypropylene utilizing a platen press to provide a finished polypropylene thermoplastic sheet having a glass content of 40 percent by weight. The thermoplastic resin sheet produced was then tested for tensile strength and modulus and was found to have a modulus of $0.87 \times 10^6$ and a tensile strength of 29,381 pounds per square inch. By contact a mat product was prepared on the same needling machine at 240 penetrations per square inch which had a glass content of 40.8 percent by weight and in which needles were utilized which had barbs oriented in a downward direction. When this mat was utilized to prepare a fiber glass reinforced polypropylene thermoplastic resin sheet using the same type polypropylene and tested for modulus and tensile strength, the modulus was $0.75 \times 10^6$ and the tensile strength of 22,618 pounds per square inch.

As will be readily appreciated, by utilizing the reverse barbed needle of the instant invention substantial increase in the strength of a thermoplastic laminate can be readily obtained. If desired, the mat produced by the instant invention may also be used to reinforce other resin matrices such as polyester resins, styrene based resins and the like. While the invention has been described with reference to certain specific examples and illustrative embodiments it is not intended to be limited thereby except insofar as appears in the accompanying claims.

I claim:

1. A fiber glass continuous strand mat suitable for reinforcing a resin matrix comprising a mat of continuous glass strands having at least two overlying layers of continuous glass strands and having continuous glass strands and/or filaments oriented in a direction transverse to the mat length, said continuous glass strands and/or filaments so oriented being entangled in the continuous glass strands forming the major portion of the mat and wherein one surface of the mat contains little or no glass filaments at that surface which are not in continuous form.

2. The mat of claim 1 wherein the continuous glass strand is needled.

3. The article of claim 2 wherein the continuous glass strand mat is needled.

4. A fiber glass reinforced thermoplastic resin sheet having as primary reinforcement a fiber glass continuous strand mat in which a significant portion of the fiber glass continuous strand mat has fiber glass strands and filaments oriented in a direction transverse to the mat length and wherein the said fiber glass strands and filaments so disposed are entangled in the fiber glass continuous strands forming the major portion of the mat and wheren one surface of the mat contains little or no fiber glass fibers at the surface which are not in continuous strand form.

5. In the needling of a fiber glass continuous strand mat wherein a plurality of needles are passed through a mat surface as mat is advanced through a needling zone to thereby entangle glass strands in the continuous strand mat the improvement comprising:

penetrating the mat on the downward stroke of the needling machine with a needle that does not entangle any strands during said downward stroke but which penetrates the mat;

entangling strands of the mat in the needle during the upward stroke of the needling machine to move strands in the mat in contact with each needle vertically to orient such entangled strands in a direction vertical to the long axis of the mat and disengaging the strands so moved from the needle as it leaves the surface of the mat while providing for little or no fracturing of the strands so moved.

6. The method of claim 5 wherein the needle penetrations of the mat are between 200 to 600 penetrations per square inch.

7. The method of claim 5 wherein the needle penetrations in the mat are between 200 to 600 penetrations per square inch.

8. In the preparation of a mat for use in reinforcing a thermoplastic resin sheet the steps of feeding a fiber glass continuous strand mat to a needling zone passing a plurality of needles through the mat said needles being barbed and constructed so that they pass freely through the mat on the down stroke, trapping fiber glass filaments in the barbs of the needles as the needles are pulled back up through the mat to move the fiber glass filaments vertically a distance no greater than the width of the mat, disengaging the fiber glass filaments from the needle as they leave the surface of the mat and continuing the reciprocating needling of the mat structure during its passage through the needling zone.

* * * * *

UNITED STATES PATENT AND TRADEMARK OFFICE
CERTIFICATE OF CORRECTION

PATENT NO. : 4,277,531

DATED : July 7, 1981

INVENTOR(S) : Charles E. Picone

It is certified that error appears in the above-identified patent and that said Letters Patent are hereby corrected as shown below:

Column 1, line 15 "process" should be --processes--.

Column 2, line 58 "through" should be --though--.

Column 5, line 30 "propiomate" should be --propionate--.

Column 5, line 41 "beteeen" should be --between--.

Column 6, line 32 "contact" should be --contrast--.

Column 7, line 9 "wheren" should be --wherein--.

Signed and Sealed this

Twenty-seventh Day of October 1981

[SEAL]

Attest:

GERALD J. MOSSINGHOFF

*Attesting Officer*     *Commissioner of Patents and Trademarks*